United States Patent
Kochanski (10) Patent No.: US 7,343,397 B2
(45) Date of Patent: Mar. 11, 2008

(54) METHOD AND APPARATUS FOR PERFORMING PREDICTIVE CACHING OF DNS REQUESTS BY CORRELATING IP ADDRESSES

(75) Inventor: Gregory P Kochanski, Dunellen, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 1076 days.

(21) Appl. No.: 10/112,526

(22) Filed: Mar. 29, 2002

(65) Prior Publication Data

US 2003/0187746 A1    Oct. 2, 2003

(51) Int. Cl.
*H04L 12/46* (2006.01)
*G06F 15/16* (2006.01)

(52) U.S. Cl. .................... 709/218; 709/203

(58) Field of Classification Search ........... 705/26, 705/27, 37; 709/201, 202, 203, 217, 218, 709/219, 225, 227, 228, 238, 245, 246
See application file for complete search history.

(56) References Cited

U.S. PATENT DOCUMENTS

| | | | |
|---|---|---|---|
| 5,913,210 A * | 6/1999 | Call ........................... 707/4 |
| 6,016,512 A * | 1/2000 | Huitema ..................... 709/245 |
| 6,067,565 A * | 5/2000 | Horvitz ...................... 709/218 |
| 6,185,669 B1 * | 2/2001 | Hsu et al. ................... 712/205 |
| 6,332,158 B1 * | 12/2001 | Risley et al. ................ 709/219 |
| 6,412,014 B1 * | 6/2002 | Ryan ........................... 709/245 |
| 6,502,135 B1 * | 12/2002 | Munger et al. ............. 709/225 |
| 6,553,488 B2 * | 4/2003 | Yeh et al. ................... 712/239 |
| 6,606,645 B1 * | 8/2003 | Cohen et al. ............... 709/203 |
| 6,976,090 B2 * | 12/2005 | Ben-Shaul et al. ......... 709/246 |
| 7,213,071 B2 * | 5/2007 | DeLima et al. ............. 709/227 |
| 2002/0099616 A1 * | 7/2002 | Sweldens ..................... 705/26 |
| 2002/0103778 A1 * | 8/2002 | Saxena ......................... 707/1 |
| 2003/0147403 A1 * | 8/2003 | Border et al. ........... 370/395.53 |

OTHER PUBLICATIONS

Gralla, "How the Internet Works" (Aug. 1999), Chapter 7, pp. 32-35, "How the Domain Name System Works."*
Internet RFC 882—Domain names: Concepts and facilities, Nov. 1983.*
Internet RFC 1862—Report of the IAB Workshop on Internet Information Infrastructure, Nov. 1995.*
Kroeger, T.M. and Long, D.D.E: "*Predicting File System Actions from Prior Events*", In proceedings of the USENIX 1996 Annual Technical Conference, Jan. 1996, pp. 319-328.

(Continued)

*Primary Examiner*—Gerald J. O'Connor
(74) *Attorney, Agent, or Firm*—Kenneth M. Brown (57) ABSTRACT

Content on the World Wide Web is made available for downloading by distributing it to cache providers. The content provider is a distinct entity from the cache providers and enters into contractual arrangements in order to benefit from the services provided by the cache providers. The contractual arrangements specify certain rights in cache resources that are bought and sold as commodities, exemplarily through a broker or exchange. An exemplary such right is the right to a stated amount of bandwidth, in a stated time interval, for servicing download requests. Responsive to such contractual arrangements, a redirective element such as a DNS server is programmed to redirect, to one or more cache providers, download requests initially addressed to the content provider.

10 Claims, 5 Drawing Sheets

OTHER PUBLICATIONS

Cohen, E. and Kaplan, H.: "*Proactive Caching of DNS Records: Addressing a performance Bottleneck*", Proc. of the 2001 Symposium on Applications and the Internet (SAINT), San Diego, CA, Jan. 2001.

Hughes, Amy S.: "*Use of Cooperation Across Semantic Boundaries to Enhance Network Object Caches*", Ph.D. Dissertation Proposal, Computer Science Department, University of Southern California, May 2000.

Zhang, Haining: "*Improving Performance On www Using Path-Based Predictive Caching And Prefetching*"; Master of Science Thesis, School of Computing Science, Simon Fraser University, Feb. 2001.

U.S. Appl. No. 09/767,640, W. Sweldens, "*System And Method For Distributing Web Content On A Network*", filed Jan. 23, 2001.

\* cited by examiner

METHOD AND APPARATUS FOR PERFORMING PREDICTIVE CACHING OF DNS REQUESTS BY CORRELATING IP ADDRESSES

FIELD OF THE INVENTION

The present invention relates generally to packet-based data networks and in particular to a method and apparatus for improving the performance of such networks by performing predictive caching of DNS (Domain Name System) requests based on correlations between IP (Internet Protocol) addresses.

BACKGROUND OF THE INVENTION

The DNS (Domain Name System) is an Internet service that translates domain names into IP (Internet Protocol) addresses. Since domain names are alphabetic, whereas IP addresses are numerical, they are easier to remember. However, communication within the Internet is, in fact, based on IP addresses. Therefore, each time an Internet user specifies a domain name, a DNS service needs to translate the name into a corresponding IP address. For example, the domain name "www.example.com" might illustratively translate into an IP address "198.105.232.4". This translation process is initiated by what is referred to as a DNS request, and results in a response containing an appropriate IP address.

As people get higher speed connections to the Internet, DNS lookup time becomes a larger fraction of the total. This is because DNS request and response packets are small, and little of the time required to process a DNS request is spent in data transfer to the home computer—rather, most of the time is spent in network delays or DNS server response time. Consequently, for example, DNS lookup time is almost unchanged between systems employing a slow 14.4 kilobit/second modem and those employing a fast 300 kilobit/second DSL (Digital Subscriber Line) connection. In fact, DNS lookup time can even become dominant under certain conditions.

It is well known that network performance can in general be improved with the use of various caching techniques. Clearly, network caches can be used to reduce client latency when a requested object is already in the cache. For example, one commonly used technique involves the caching of web pages, so that repetitive access to a given web page does not require a complete re-fetch of the page. Moreover, it has been suggested that such web page caching may also be advantageously based on a "predictive" model, in which pre-fetching of web pages (i.e., fetching a page prior to a specific user request for the information) is performed. Typically, such pre-fetching will be advantageously based on the identification of web pages which are likely to be requested in the near future. Such identification of likely future web page requests may, for example, be based on web links which happen to be included on a given web page which has just been accessed. Alternatively, such a predictive model (i.e., the identification of likely future web page requests) may be based on a statistical analysis involving a correlation between past web page requests.

In addition, it has been suggested that predictive caching of DNS requests be performed as well. Unfortunately, DNS caches normally have no inherently useful predictive information such as is available on web pages (e.g., web links). But in "Use of Cooperation Across Semantic Boundaries to Enhance Network Object Caches," A. S. Hughes, PhD Dissertation Proposal, Computer Science Department, University of Southern California, May 2000, it was suggested that cache cooperation can be extended from a single domain to include caches from more than one domain. For example, cross-domain cooperation between a Web cache and a DNS cache may be implemented such that the available predictive information of web pages can be used to pre-fetch DNS requests.

SUMMARY OF THE INVENTION

It has been recognized that one particularly useful approach for performing predictive caching of DNS requests would be to pre-fetch DNS requests based on a statistical model which correlates past DNS requests with each other. However, one problem with such an approach is that DNS requests are typically stopped by caches at several different levels. For example, a DNS request may be stopped by the cache in the web browser, in the client's computer, or in a local DNS server. In fact, it has been estimated that over 90% of all DNS requests are caught by caches. Therefore, any attempt to directly build an accurate statistical model correlating DNS requests would be limited.

However, the actual IP requests (i.e., the web page requests which specify a particular IP address and which typically result from a prior DNS request), on the other hand, are not usually stopped. Therefore, these IP requests may be advantageously examined and analyzed by, for example, a firewall and/or other intermediary process. That is, by using actual IP requests as a basis for correlating DNS requests, much more useful predictive information can be obtained than could be determined with the use of DNS request correlations performed directly.

Thus, in accordance with the principles of the present invention, predictive caching of DNS requests is performed by building a statistical model of which IP addresses follow other IP addresses (i.e., correlating IP addresses), and given such a model, it can be advantageously used to anticipate a client's (likely) DNS requests. These anticipated DNS requests may then be "pre-fetched" prior to an actual client request therefor.

More particularly, in accordance with one illustrative embodiment of the present invention, IP addresses contained in network data packets are extracted and converted into one or more corresponding domain names. Then, the domain names which have been determined based on these IP addresses are correlated with domain names which are similarly determined based on IP addresses extracted from network data packets which follow soon thereafter. As a result, a database containing a list of domain name correlations is generated, the database comprising a statistical model representative of which IP addresses are likely to follow other IP addresses. Then, when a network data packet containing a given IP address is intercepted and the given IP address extracted and converted to one or more corresponding domain names, one or more DNS requests may be advantageously pre-fetched based on the database of domain name correlations.

DETAILED DESCRIPTION

Overview of an Illustrative Embodiment in Accordance with the Present Invention

Figure 1:
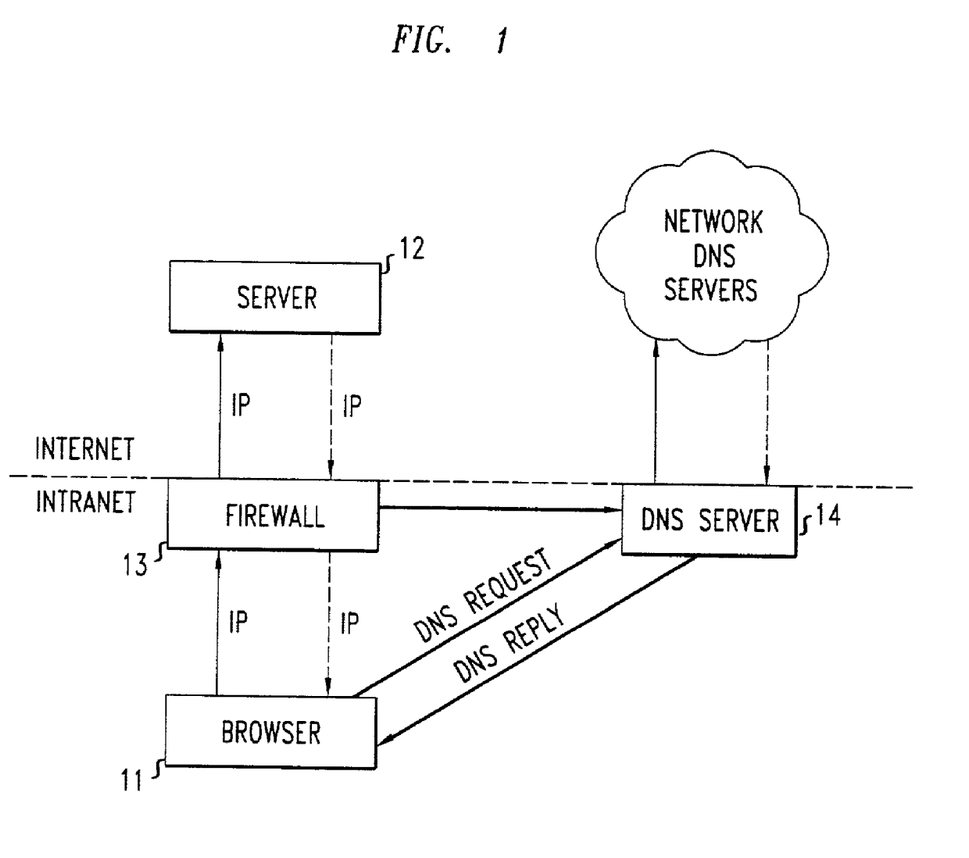
FIG. 1 shows a high-level view of a portion of a packet-based data network such as the Internet in which an illustrative embodiment in accordance with the present invention is being advantageously employed.

FIG. 1 shows a high-level view of a portion of a packet-based data network such as the Internet in which an illustrative embodiment in accordance with the present invention is being advantageously employed. The portion of the network shown includes Browser 11, Server 12, Firewall 13 and DNS server 14. In accordance with the operation of an illustrative embodiment of the present invention, Browser 11 initially sends an "http" (e.g., web page) request to an external server, Server 12. The packets comprising the request advantageously pass through Firewall 13 and out of the local environment (e.g., a corporate intranet or an Internet Service Provider network). In accordance with the principles of the present invention, Firewall 13 also extracts the IP addresses from the packets, compresses the stream of addresses, and sends the information to DNS server 14.

Given the IP addresses extracted by Firewall 13, DNS server 14 advantageously calculates correlations of IP addresses with other IP addresses which follow, converting the IP addresses into domain names for later use in performing pre-fetching of DNS requests. Specifically, the IP addresses to be correlated are generally those addresses on the given IP packets that corresponds to computer systems not served by DNS server 14. For example, the IP addresses to be correlated with others would be the destination address for "outgoing" packets (i.e., those enroute from Browser 11 to Server 12), and the source address for "incoming" packets (i.e., those enroute from Server 12 to Browser 11). In the general case, where multiple browsers are served by the same firewall and DNS Server, it may be advantageous to tag each of these IP addresses to be correlated, with the IP address of the browser which either sent of received the given packet. (This IP address will be referred to herein as the "browser address.") Then, independent sets of correlation data may be generated and stored for each browser. (See more detailed discussion below.)

Figure 2:
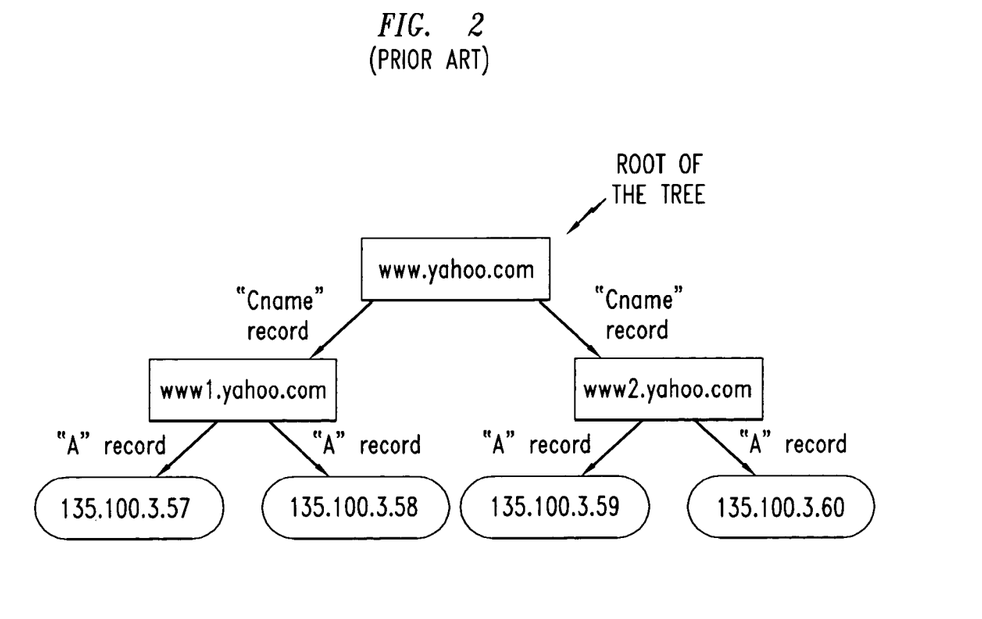
FIG. 2 shows a sample domain name to IP address association tree in which one root domain name maps into a set of distinct IP addresses.

Note that a given domain name often maps into several IP addresses. In particular, FIG. 2 shows a sample domain name to IP address association tree in which one root domain name maps into a set of distinct IP addresses. Illustratively, as shown in the figure, the root domain name "www.yahoo.com" maps via CNAME-records into two sub-domain names—"www1.yahoo.com" and "www2.yahoo.com"—and each sub-domain name maps via A-records into one or more IP addresses. (CNAME-records, which define additional domain names which may be used in place of a given domain name, and A-records, which define corresponding IP addresses for a given domain name, are both conventional and fully familiar to those of ordinary skill in the art.) Note that, in general, such an association tree may have multiple, hierarchical levels—that is, there may be more than one hierarchical level of CNAME-records.

Figure 3:
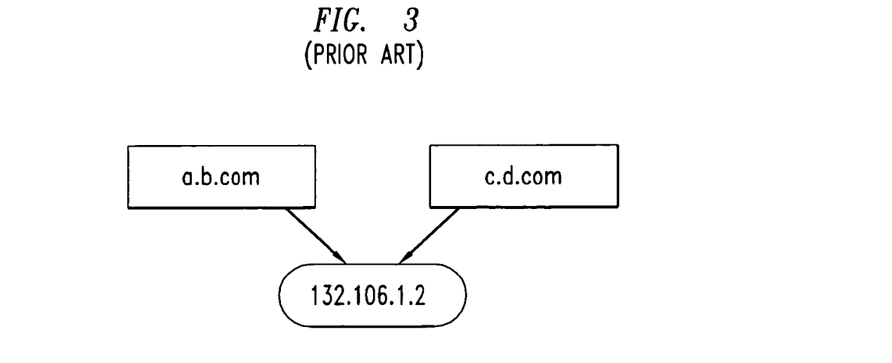
FIG. 3 shows a sample domain name to IP address association tree in which a plurality of different domain names maps onto a single IP address.

Similarly, note that multiple domain names can map onto the same IP address as well. FIG. 3 shows a sample domain name to IP address association tree in which a plurality of different domain names maps onto a single IP address—illustratively, "a.b.com" and "c.d.com" map onto the same IP address, "132.106.1.2". In other words, multiple A-records can contain the same IP address.

In accordance with an illustrative embodiment of the present invention, therefore, an incoming stream of IP addresses to be correlated is advantageously converted to a stream of domain name equivalence classes as may, for example, be defined by an association tree such as that illustrated in FIG. 2. These equivalence classes may, for example, be determined by expanding each IP address into all of the possible names that might yield that address. The class may then be advantageously and easily represented as a list of domain names. In the event that a mapping into one or more names is not possible (e.g., the relevant A-records are not available), the IP addresses may, in accordance with one illustrative embodiment of the present invention, be passed through unmapped.

Next, in accordance with the illustrative embodiment of the present invention, the classes are then passed through to a prediction subsystem which advantageously collects correlations between domain names. And finally, in a parallel path, when an IP address is encountered, the illustrative system in accordance with the present invention converts the IP address to one or more domain names and then advantageously predicts likely future domain name requests based upon the correlations which have been previously collected. In particular, from among those correlations with non-negligible probabilities, it advantageously selects domain names that are not already in the DNS cache (and, in addition, advantageously selects those that are within about 30 seconds of expiration), and performs a pre-fetch of a DNS request therefor.

The Detailed Operation of an Illustrative Embodiment of the Present Invention

Figure 4:
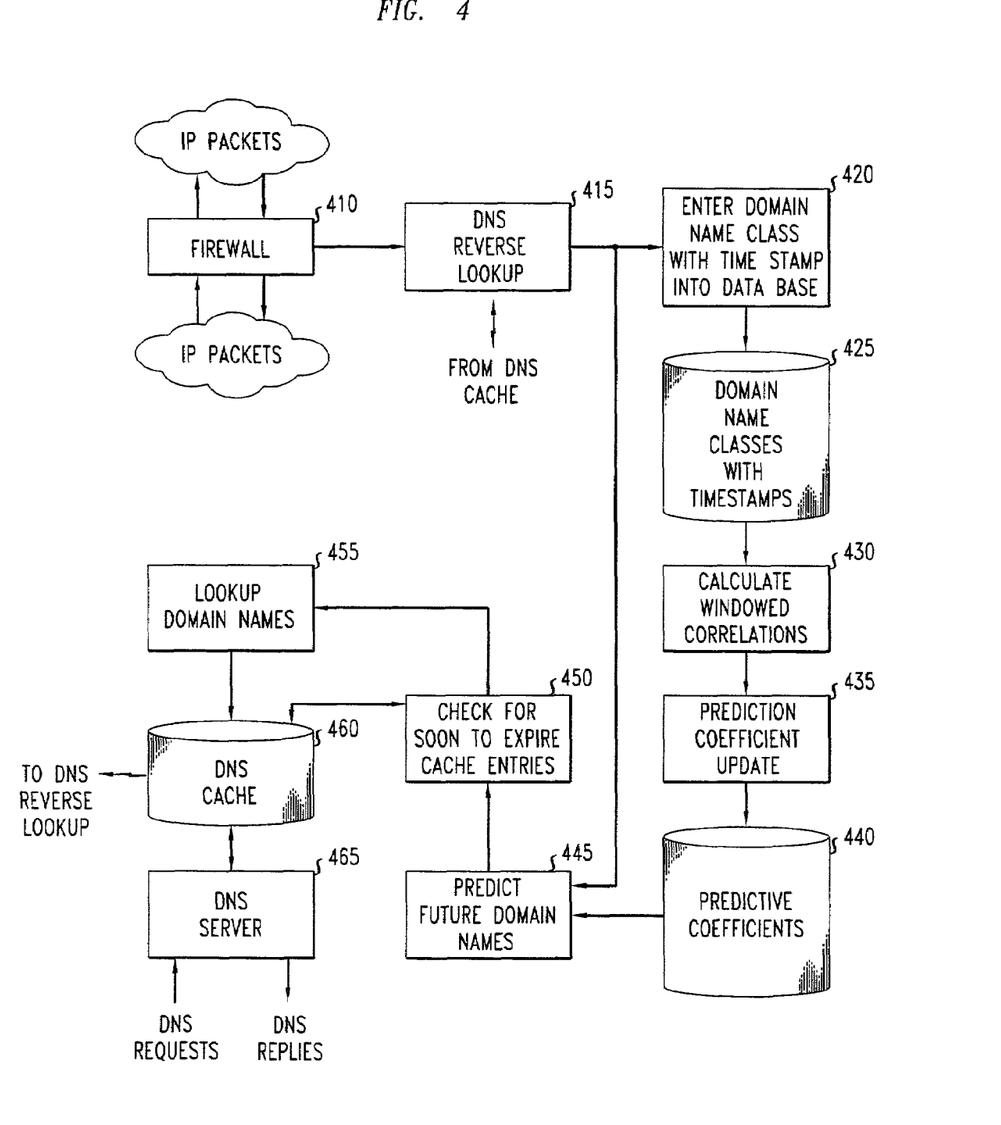
FIG. 4 is a block diagram showing the detailed operation of an illustrative embodiment of the present invention.

FIG. 4 is a block diagram showing the detailed operation of an illustrative embodiment of the present invention. As shown in the figure, IP packets (both incoming and outgoing) are continuously received by Firewall 410, which extracts the appropriate IP addresses from the IP packet headers (i.e., the destination address for an outgoing packet and the source address for an incoming packet), and provides them to a DNS reverse lookup module (block 415). The DNS reverse lookup module advantageously generates a domain name equivalence class for each IP address provided, based at least on available CNAME-records and A-records. (See FIG. 5 and the discussion thereof below for an illustrative implementation of DNS reverse lookup module 415.) Specifically, each domain name equivalence class includes all of the domain names which can produce the given IP address, as could, for example, be determined by the CNAME-records and A-records that make up the association tree which includes the given IP address. Then, these resulting sets (i.e., equivalence classes) of domain names, together with corresponding timestamps representative of the time that the given IP address was encountered, and in the case where multiple browsers are served by the same firewall and DNS server, also advantageously together with the browser address identifying the internal source or destination of the packet, are stored in database 425 by module 420.

Next, module 430 calculates time-windowed correlations between the domain names, and Prediction coefficient update module 435 updates the resultant prediction coefficients which are stored in database 440. Specifically, each prediction coefficient, P(X|Y), advantageously defines a probability that a given domain name equivalence class, X, will be requested by the associated browser, given that domain name equivalence class Y has been generated from a previously extracted IP address which was encountered within the given time window (e.g., the last 10 or 100 seconds). (See FIG. 6 and the discussion thereof below for an illustrative implementation of Prediction coefficient update module 435.)

In accordance with one illustrative embodiment of the present invention, it may be advantageous to generalize the prediction coefficients to include those of the form P(X|Y&Z), thereby defining a probability that a given domain name equivalence class, X, will be requested, given that each of two distinct domain name equivalence classes, Y and Z, have been generated from previously extracted IP addresses encountered within the given time window. Although this will, in general, require the use of additional IP packet data, it may provide for more accurate predictions of future DNS requests.

Returning to the figure, given a (preferably, continuously updated) set of prediction coefficients, module 445 predicts one or more domain names which have a non-negligible probability of being requested by the given browser in the near future—that is, based on past domain name (actually IP address) activity. For each such predicted domain name, module 450 examines DNS cache 460, which is associated with DNS server 465, to determine whether the predicted domain name is already in the cache, and if so, whether it will soon expire—say, within the next 30 seconds, for example. (As is well known to those of ordinary skill in the art, in accordance with the Internet protocol all cached DNS records have an expiration time after which they are no longer "guaranteed" to be valid.) For those predicted domain names which are either not in the DNS cache or are in the cache but are about to expire, module 455 requests a DNS lookup for the given domain name—that is, module 455 forces a pre-fetch of the DNS request to occur.

The Detailed Operation of an Illustrative DNS Reverse Lookup Procedure

Figure 5:
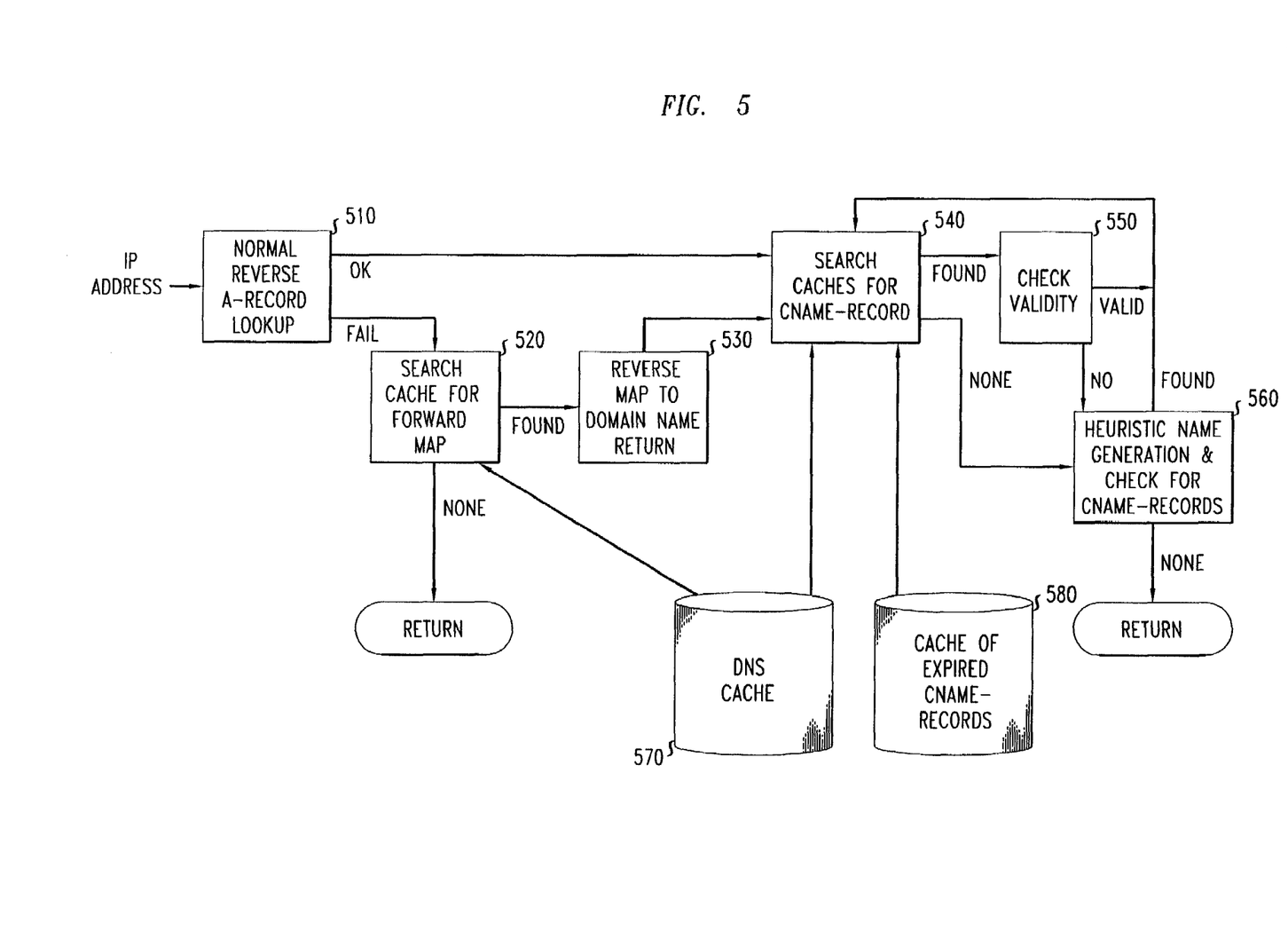
FIG. 5 is a block diagram showing the operation of an illustrative DNS reverse lookup process as may be performed in the illustrative embodiment of the present invention shown in FIG. 4.

FIG. 5 is a block diagram showing the operation of an illustrative DNS reverse lookup process (i.e., module 415 of FIG. 4) as may be performed in the illustrative embodiment of the present invention shown in FIG. 4. As pointed out above, the purpose of this procedure is to determine a set of root domain names, any of which could have produced the given IP address. Note that, illustratively, a group of IP addresses is named by the combination of its root domain names.

The illustrative DNS reverse lookup procedure shown in FIG. 5 begins with module 510 which performs a reverse A-record lookup on the given IP address. (Reverse A-record lookups are conventional and fully familiar to those of ordinary skill in the art.) If this reverse A-record lookup fails (e.g., the relevant A-record is not directly available), DNS cache 570 may be advantageously searched by module 520 for a forward mapping which contains the given IP address. In other words, DNS cache 570 is searched for records of the form "A 'name'=IP", where IP is the given IP address and where 'name' is an arbitrary domain name. If this search also fails (i.e., no such records are found), then only the IP address itself is returned (since this is the best that can be done). If, on the other hand, module 520 succeeds in finding a one or more such records in DNS cache 570, module 530 then produces a list of names which could have provided the given IP address.

Given that one or more domain names corresponding to the given IP address have been identified, these are added to the domain name return set (i.e., the set of domain names which will ultimately be returned by the procedure of FIG. 5). Before the procedure terminates, however, DNS cache 570 is searched for any appropriate CNAME-records which may provide additional domain name equivalents. Specifically, DNS cache 570 is searched for records of the form "CNAME 'x'='name'" in order to identify the domain name 'x' as an equivalent of 'name'. In addition, expired cache 580, which is a cache of expired CNAME-records, may also be advantageously searched for such records, since most likely, the information in these CNAME-records is still useful. (Moreover, as will be seen below, its accuracy will be verified.)

Given that one or more appropriate CNAME-records have been found, module 550 is used to check the validity of the given domain name (i.e., that it in fact corresponds to the given IP address) by performing a DNS query, which may, if necessary, require going out to the Internet. If no such records have been found by module 540, module 560 may then be advantageously used to apply one or more heuristics in an attempt to generate likely domain name equivalents, and, if any such heuristics succeed, to then check for such CNAME-records by performing appropriate DNS lookups. For example, one such heuristic would be to recognize that the generated domain name return set contains a domain name of the form "wwws.xxx.com", where s is a digit, and then to generate therefrom the domain name "www.xxx.com" for possible addition to the domain name return set.

Finally, given that any appropriate CNAME-records have been identified (e.g., found and verified by modules 540 and 550, respectively, or successfully generated and checked by module 560), the equivalent names provided thereby are added to the domain name return set. Then, control returns once again to module 540 in an attempt to proceed one level further up in the association tree (which may, in general, have several hierarchical levels) to find still additional domain name equivalents if they exist. (See, e.g., FIG. 2 and the discussion thereof, above.) Advantageously, this repetitive process may be performed as a recursive search, fully familiar to those skilled in the art. When no (further) CNAME-records have been identified (e.g., the recursive search is complete), the illustrative DNS reverse lookup procedure of FIG. 5 returns (see, e.g., the exit path leading from module 560 in FIG. 5), providing a list of all (equivalent) domain names for the given IP address which it has been able to identify.

A Mathematical Analysis of Predictive Caching of DNS Requests

Assume that we would like to predict the number of packets to IP address i that we will see in the near future. This will be denoted herein as $|w|p_i>$, where w is a window function that is zero everywhere except within the region where we want to predict (illustratively, the next 100 seconds), and $p_i$ is the probability density (i.e., the rate) of IP packets. The notation "|>" is used herein to represent a time integral—that is, $|w|p>$ is a function of time, and it equals $\int_{-\infty}^{\infty} w(\tau)p(t-\tau)d\tau$. The predicted rate can be expressed as a linear combination of past measurements:

$$|w|p\rangle \cong c_{j,k,q} |b_k|p_q\rangle, \qquad (1)$$

where $c_{j,k,q}$ is an array of coefficients that will be used to predict the rates, and $b_k$ is a measurement window which is nonzero only for past data. In this general form of the equation, several different windows in the past may be used to "predict" the future. Typically one might cover the immediate past—perhaps only the last second—and would thereby determine correlations that arise, for example, from automatic links on web pages which result from when the browser is instructed to get a style sheet or an image. Another window or two could determine correlations over longer times—up to 10 or 100 seconds, for example. Such windows might determine correlations arising from manually activated links on web pages.

One typical way to solve the above equations is to recast them in terms of correlations, by multiplying by $\langle p_i|$ and a set of M kernels. Products in the form $\langle p_i|x|p_j\rangle$ are simply numbers that are independent of time. Specifically, $$\langle p|x|y|p\rangle = \int p(t)x(\tau_1)y(\tau_2)p(t+\tau_1+\tau_2)dt d\tau_1 d\tau_2/T, \qquad (2)$$

where T is the length of the integral over dt—normally the length of the available data. We use $b_k$ for the kernels, so the number of equations equals the number of unknowns, but different kernels could be used, provided that they cover about the same region of the past as the set of $b_k$. Alternatively, more kernels could be used, in which case the resulting equations would be over determined, and could then be solved through different, but well known techniques familiar to those of ordinary skill in the art.

After left-multiplying, the following set of $N^2M$ equations is obtained, where N is the number of distinct classes of IP addresses that have been seen:

$$\langle p_i | b_m | w | p_j \rangle = \sum_{k,l} c_{j,k,q} \cdot \langle p_i | b_m | b_k | p_q \rangle, \qquad (3)$$

In principle, one collects windowed correlations between all different IP addresses—that is the $\langle p_i|b_m|w|p_j\rangle$ and the $\langle p_i|b_m|b_k|p_q\rangle$, and then one solves the set of equations for $c_{j,k,q}$.

In practice, however, there are far too many IP addresses to make a direct solution of those equations efficient. Thus, it is advantageous to force the equations to be sparse, without damaging their predictive power. This can be accomplished by various techniques which will be familiar to those skilled in the art, including, for example, by removing correlations that include IP addresses that appear very rarely, such as those that appear only once in the available data.

Note that since individual computers typically work independently, one would expect little correlation between IP requests made by different computers. Thus, it is normally advantageous to use only correlations between IP packets associated with the same browser (as described above). In equation (3), therefore, both correlations in the angle brackets would be advantageously so constrained. The specific tagging mechanism described above, in which the IP addresses and their correlations are tagged with an associated browser address, may be advantageously used to implement such a constraint.

Further, it is advantageous to force the solution—the $c_{j,k,q}$—to be sparse. It is known that c is sparse because most web pages only point to a few other computers. Thus, $c_{j,k,q}$ should have only a few significantly nonzero entries for each (k,q) pair, out of the N possibilities.

An iterative approach to calculating the set of c works well, and is especially useful for DNS prediction, as one can start predicting even with a partial set of c values. Further, as new data comes in, the correlation matrices may be advantageously updated, and, as they are recalculated, any new c values will advantageously reflect the new data. Therefore, in accordance with one illustrative embodiment of the present invention, a predictive coefficient update process is running independently, thereby continuously updating the set of c values.

The Detailed Operation of an Illustrative Predictive Coefficient Update Process

Figure 6:
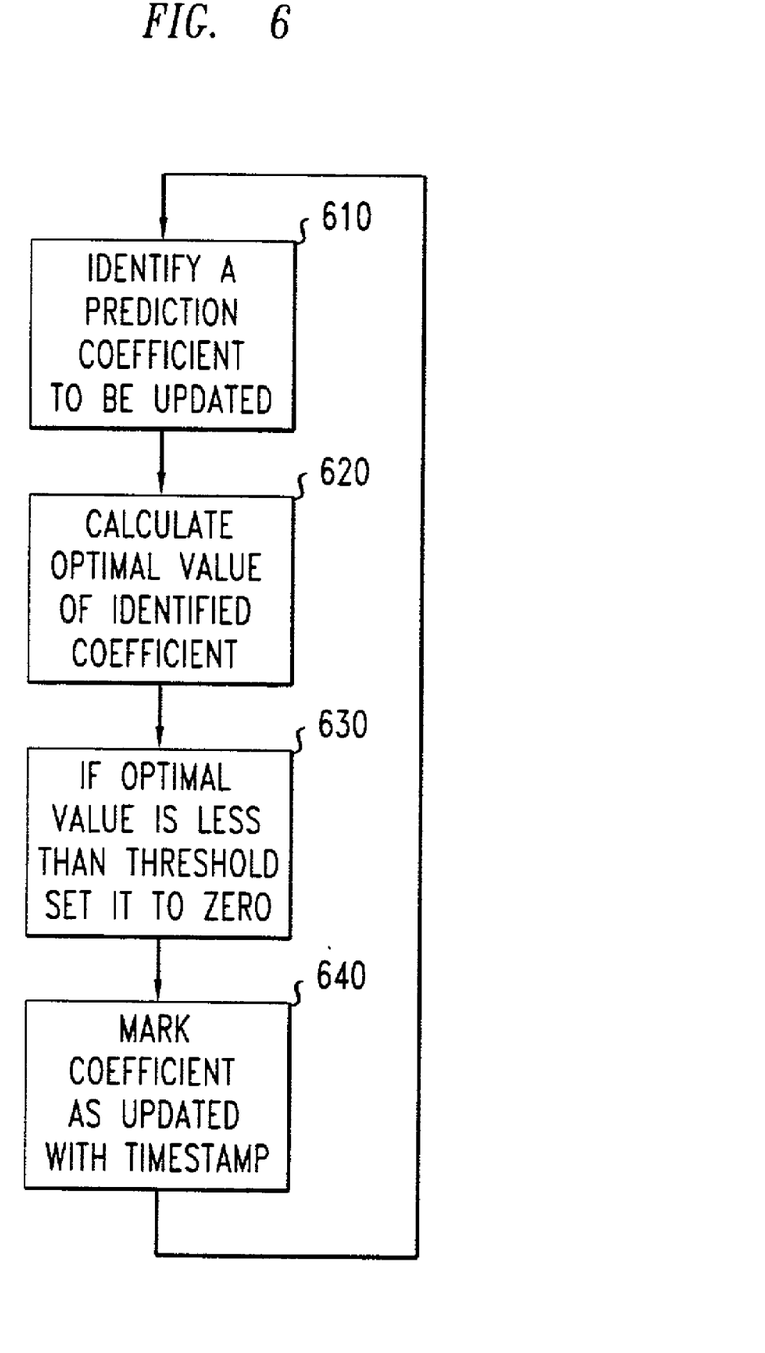
FIG. 6 shows a flowchart for the operation of an illustrative Predictive coefficient update process as may be performed in the illustrative embodiment of the present invention shown in FIG. 4.

An illustrative predictive coefficient update process of one embodiment of the present invention has four steps, and is a variant of a conventional steepest descent optimization algorithm, fully familiar to those skilled in the art. Specifically, FIG. 6 shows a flowchart for the operation of an illustrative Predictive coefficient update process (i.e., module 435 of FIG. 4) as may be performed in the illustrative embodiment of the present invention shown in FIG. 4. The four steps to be iteratively (and, preferably, continuously) performed are as shown by flowchart blocks 610, 620, 630 and 640, respectively, of FIG. 6 and are:

1. Step 1 (block 610): Identify one of the $c_{j,k,q}$ entries to be updated. A variety of heuristic techniques, each familiar to those skilled in the art, may be used in order to make this choice. One approach, for example, is to simply iterate through all the (j,k,q) triplet combinations in some straight-forward but arbitrary order.

In accordance with one illustrative embodiment, however, the following particular approach is employed. First, assume that some arbitrary order is defined for the (j,k,q) triplets which can be merely a random choice. Then,     a. Iterate the following step (i.e., step b, immediately below) over the next Q of the (i,k,q) triplets, calculating a score for each, for some selected value of Q. The value of Q is typically, $1 \leq Q < 1000$, and more typically $1 < Q < 100$.

b. Choosing random values for variables i and m, the score, s, is then $$s = \text{abs}\left(\langle p_i | b_m | w | p_j \rangle - \sum_{k,l} c_{j,k,q} \cdot \langle p_i | b_m | b_k | p_q \rangle\right) \cdot \qquad (4)$$
$$\langle p_i | b_m | b_k | p_q \rangle + \gamma \cdot g,$$

where g is the time (or, equivalently, the difference in sequence numbers) since the last update of that particular $c_{j,k,q}$. Choose (so that the term containing (is (on average) between 0.1 and 10 times the remaining term. Alternatively, w (or any other window function) can be substituted for $b_m$, although doing so will require additional calculation and storage of more correlations. Alternatively, rather than choosing random values for i and m, the score can be calculated by summing over any subset of (i,m) pairs.

c. And then choose the (i,k,q) triplet with the largest score, s.

2. Step 2 (block 620): Calculate the "optimal" value of $c_{j,k,q}$. The optimal value is the one that minimizes the norm of the difference between the left and right sides of equation (3) above. This optimization can be advantageously reduced to a single linear equation and solved by well-known techniques fully familiar to those skilled in the art, if the norm chosen is the 2-norm. It can be solved numerically by other well-known techniques familiar to those skilled in the art for other norms.

3. Step 3 (block 630): If the optimal value is negative, or if it is positive but small, set it to zero. Values that are small are defined in this context as being less than some threshold, ∀, where ∀ is typically in the range 0.0001<∀<10, and more typically, 0.001<∀<1. Advantageously, further small values may be defined as those $c_{j,k,q}$ such that $c_{j,k,q}$ A<1|b$_k$|pq> is smaller than some threshold, ∃. Typically, 0.001<∃<100, and more typically, 0.1<∃<2. Then, define $$<1|y|p> = \int y(\tau)p(t)dtd\tau/T, \quad (5)$$

which is just the average number of instances of a certain address in a window y.

4. Step 4 (block 640): Mark $c_{j,k,q}$ as having been updated with a time stamp or sequence number. Then repeat the four steps on another c coefficient.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method for use in an IP packet-based data network, the method comprising the steps of:
   receiving first and second IP packets and extracting corresponding first and second IP addresses therefrom;
   determining a first set of one or more domain names associated with said first IP address and a second set of one or more domain names associated with said second IP address;
   correlating the first set of domain names with the second set of domain names based upon a corresponding correlation of a time of receipt of said first IP packet with a time of receipt of said second IP packet;
   receiving a third IP packet, extracting a third IP address therefrom, and determining a third set of one or more domain names associated with said third IP address;
   identifying said first set of domain names as including one or more domain names included in said third set of domain names; and
   performing one or more DNS requests relating to one or more of said domain names included in said second set of domain names based on said correlation of said second set of domain names with said identified first set of domain names.

2. The method of claim 1 wherein said IP packet-based data network comprises the Internet.

3. The method of claim 1 wherein each of said IP packets are received at a firewall.

4. The method of claim 1 wherein said first, second and third IP packets are all associated with a given browser.

5. The method of claim 4 wherein the given browser has a browser address, wherein each of said first and second IP addresses and each of said determined first and second sets of domain names are tagged with said browser address, and wherein said step of correlating the first set of domain names with the second set of domain names is based on both sets having been tagged with said browser address.

6. The method of claim 1 wherein each of said sets of domain names are determined based on correspondingly derived domain name association trees which include said corresponding associated IP address.

7. The method of claim 6 wherein said derivation of each of said domain name association trees comprises performing a reverse A-record lookup based on said corresponding associated IP address to identify one or more domain names to be included in said domain name association tree.

8. The method of claim 7 wherein said derivation of each of said domain name association trees further comprises identifying one or more CNAME-records related to said identified one or more domain names to identify one or more additional domain names to be included in said domain name association tree.

9. The method of claim 8 wherein said identifying one or more CNAME-records related to said identified one or more domain names comprises searching a DNS cache for said related CNAME-records.

10. The method of claim 7 wherein said derivation of each of said domain name association trees further comprises heuristically generating and checking one or more domain names based on said identified one or more domain names to identify one or more additional domain names to be included in said domain name association tree.

* * * * *